United States Patent
Chandra et al.

(10) Patent No.: US 9,256,696 B2
(45) Date of Patent: Feb. 9, 2016

(54) DYNAMIC SELECTION OF ONE OF MANY AVAILABLE WEB BROWSERS

(75) Inventors: Vikas Chandra, Bangalore (IN); Sarika Sinha, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1137 days.

(21) Appl. No.: 13/277,683

(22) Filed: Oct. 20, 2011

(65) Prior Publication Data
US 2013/0104060 A1    Apr. 25, 2013

(51) Int. Cl.
*G06F 17/30*    (2006.01)

(52) U.S. Cl.
CPC .............................. *G06F 17/30899* (2013.01)

(58) Field of Classification Search
CPC ................................................ G06F 17/30899
See application file for complete search history.

(56) References Cited

U.S. PATENT DOCUMENTS

| | | | |
|---|---|---|---|
| 6,918,066 B2 * | 7/2005 | Dutta et al. | 714/46 |
| 2001/0013043 A1 * | 8/2001 | Wagner | 707/511 |
| 2007/0271505 A1 * | 11/2007 | Dandekar et al. | 715/513 |
| 2009/0172519 A1 * | 7/2009 | Xu et al. | 715/234 |
| 2010/0218106 A1 * | 8/2010 | Chen et al. | 715/738 |

* cited by examiner

*Primary Examiner* — Alvin Tan
(74) *Attorney, Agent, or Firm* — Patent on Demand P.A.; Brian K. Buchheit; Scott M. Garrett

(57) ABSTRACT

A user selection of an item corresponding to a Web page can be received. The user selection can represents a request to open the Web page within an instantiated one of a set of Web browser applications installed on a computing device. A set of Web page elements unique to the Web page can be identified through an analysis conducted by the computing device. The identified set of Web page elements can be utilized to determine at the computing device one of the installed Web browser applications for the Web page. The determination of the one installed Web browser application can varies from Web page-to-Web page. At the computing device, the determined one of the Web browser applications can be instantiated. The Web page can be opened within the instantiated one of the Web browser applications.

18 Claims, 5 Drawing Sheets

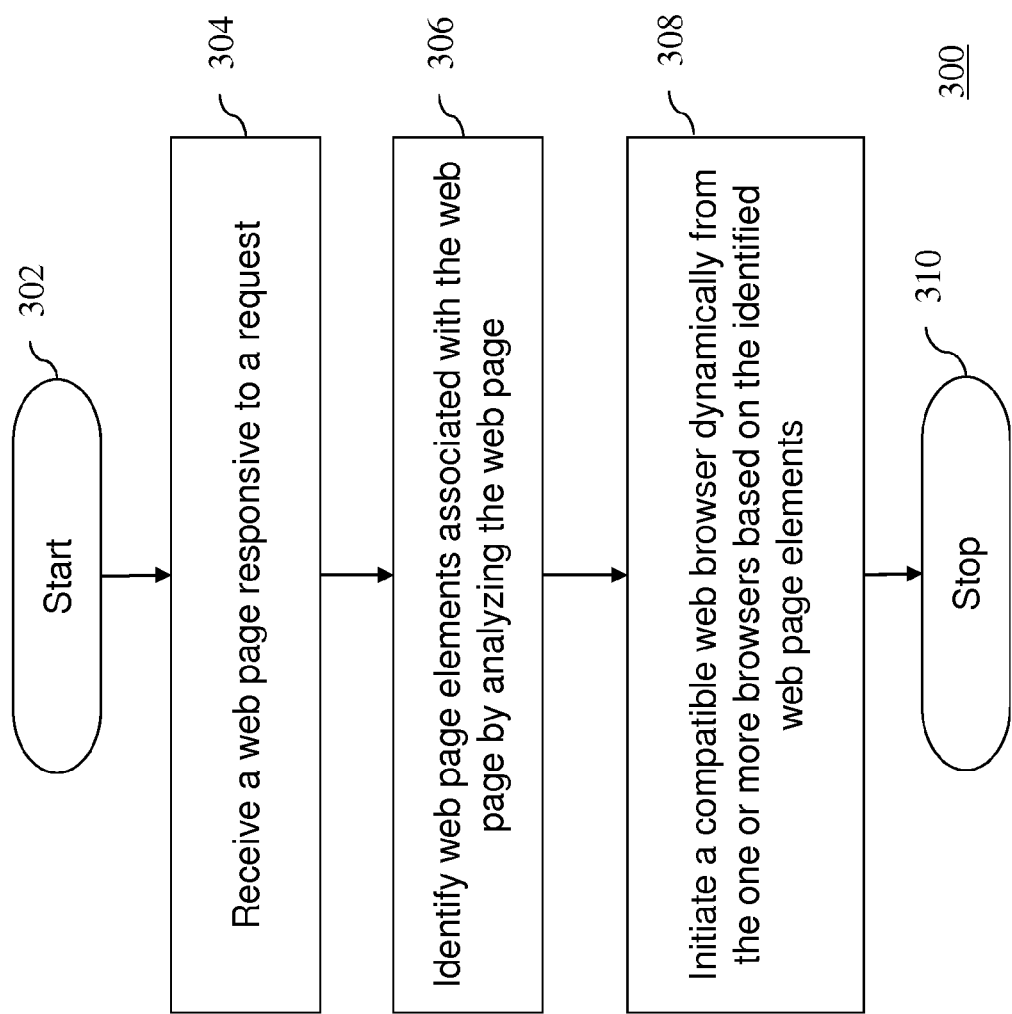

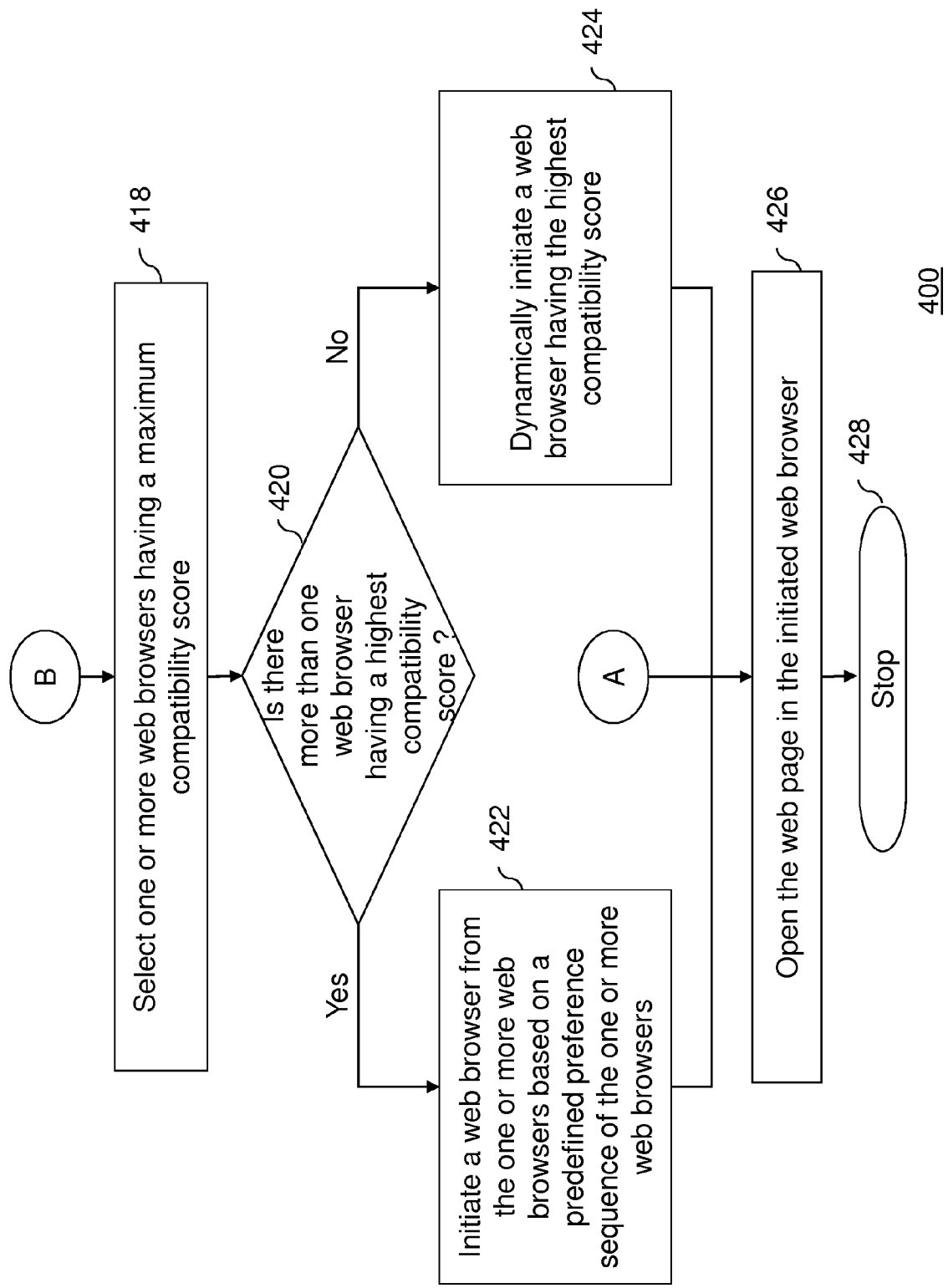

DYNAMIC SELECTION OF ONE OF MANY AVAILABLE WEB BROWSERS

BACKGROUND

The present invention relates to dynamically selecting one of many available web browsers for viewing a web page.

The internet is used to access, gather, and collect information and has become an important technology for work, advertisement and many other activities. The internet stores information in the form of web pages. In an example, the web pages are stored in a server machine and the web pages can be browsed by a user of a client machine using web browsing engines or web browsers. Generally, various conventional web browsers are available at the client machine for browsing the web pages available over the internet. These web browsers may, for example, include Internet Explorer® from Microsoft, Firefox® from Mozilla Foundation, Opera® from Opera Software, and the like. "Internet Explorer" is a registered trademark of Microsoft Corporation. "Firefox" is a registered trademark of Mozilla Foundation. "Opera" is a registered trademark of Opera Software ASA Corporation.

BRIEF SUMMARY

According to one embodiment of the present invention, a method, system, computer program product, or apparatus can receive a user selection of an item corresponding to a Web page. The user selection can represents a request to open the Web page within an instantiated one of a set of Web browser applications installed on a computing device. A set of Web page elements unique to the Web page can be identified through an analysis conducted by the computing device. The identified set of Web page elements can be utilized to determine at the computing device one of the installed Web browser applications for the Web page. The determination of the one installed Web browser application can vary from Web page-to-Web page. At the computing device, the determined one of the Web browser applications can be instantiated. The Web page can be opened within the instantiated one of the Web browser applications.

According to one embodiment of the present invention, a method, a computing device, a computer program product, and/or an apparatus can be provided for selecting a web browser. The embodiment can receive a web page responsive to a request thereafter web page elements associated with the web page is identified by analyzing the web page. The embodiment can then initiate a compatible web browser dynamically from the one or more browsers based on the identified web page elements.

BRIEF DESCRIPTION OF THE SEVERAL VIEWS OF THE DRAWINGS

FIG. 3 illustrates a flowchart diagram representing a method for selecting a web browser, in accordance with an embodiment of the invention; and FIG. 4A

DETAILED DESCRIPTION

Figure 1:
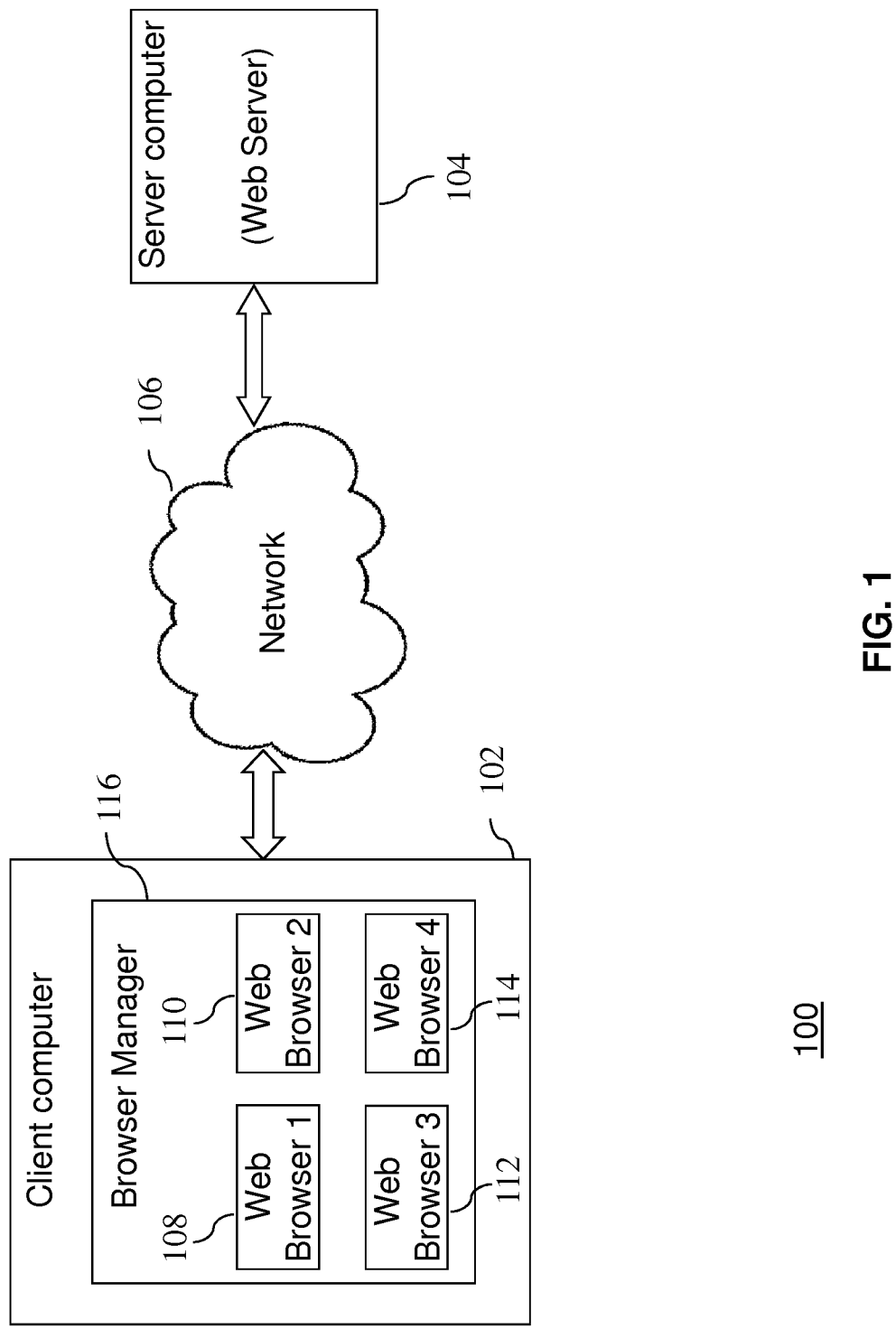
FIG. 1 illustrates an exemplary environment where various embodiment of the invention can be practiced.

The user can browse a web page using a web browser by, first selecting the web page and then requesting to retrieve the web page from the server machine. Once the web page data is rendered, the web page may be displayed to the user for viewing in the web browser available in the client machine. Generally, the web page is displayed in a default web browser or in a web browser preferred by the user. However, there may be a scenario when the data associated with the web page is not supported by the default web browser or the preferred web browser. Examples of data include tags, plug-in, versions and the like. Hence, the user may get a poor display of the web page or an error message on the web browser.

In such a scenario, the user may perform any of the following procedures to view the web page. The user may view the web page in a compatible browser by manually searching the compatible web browser using trial-and-error process. The user may even enhance the functions of the available web browser by installing or updating compatible web elements like plug-in to the preferred or default web browser. Further, the user may even request for different version of the web page that is supported by the default or preferred web browser. Generally, multiple versions of a single web page are maintained on the server in order to be supported by different web browsers. Hence, when the user requests a specific version of the web page, the server machine will provide the specific version for the user's browser.

Moreover, there may be a scenario where only one version of a web page is maintained for a specific browser, for example the web page is available for Internet Explorer only or Firefox only page. In this circumstance, if the user does not have such specific browser installed in the machine then the users may not be able to view the web page. Therefore, in order to view such web page, the user may need to install the specific web browser, and repeat the procedures to load the web page. Hence, manual searching of the compatible web browser or requesting different versions of web pages is inefficient and tedious process.

The above problems identified during the course of the disclosure have been resolved by details expressed herein. Specifically, the disclosure causes a specific one of a set of possible web browsers to be selected for opening a Web page (or other Web resource) based on its compatibility with the Web page. This selection can occur automatically, without manual user intervention. The selection can also be different than a default, which states a preference of Web browser assuming capability with a Web page to-be-opened is not an issue.

The disclosure is now described within the context of one or more embodiments, although the description is intended to be illustrative of embodiments of the invention as a whole, and is not to be construed as limiting other embodiments of the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, an environment 100 is shown to include a client computer 102 and a server computer 104. Though, only one client computer and one server computer is shown in the environment 100, the scope of the invention is not limited to only one client computer and one server computer and a person having ordinary skill in the art may use more client computers and more server computers to perform the method described herein. The server computer 104 is a computer that runs computer programs to serve the needs or requests of other programs, for example requests received from the client computer.

Examples of client computer 102 include laptop computer, palmtop computer, desktop computer, multimedia devices, smart phones, Personal Digital Assistants (PDA), and the like. Examples of server computer 104 include, but are not limited to database server, file server, web server, and mail server. In an embodiment, the server computer 104 is a web server 104. Examples of web server are Apache server, Microsoft Internet Information Services (IIS) and the like. In an embodiment, the web server 104 is hosted in the client computer 102. The web server 104 is a software or hardware that helps to deliver content, for example web pages, to the client computer using a web browser. In the environment 100, the client computer 102 is shown to include four web browsers, for example a web browser 108, a web browser 110, a web browser 112, and a web browser 114. Examples of web browser include Internet Explorer® from Microsoft, Firefox® from Mozilla Foundation, Opera® from Opera Software, and the like. The four web browsers are managed by Browser Manager 116.

The client computer 102 is connected with the web server 104 using a network 106. The network 106 is a wireless network or a wired network. Examples of network 106 include Internet, Intranet and the like. Hence, the client 102 can request for web pages stored in the web server 104 via the network 106 using any of the web browser available in the client computer 102. Once the web page is rendered through the web server 104, the web page is analyzed by the client computer 102 and the compatibility of the web page with each of the available web browser is calculated. Once, the client computer identifies the compatibility of the web page with each of the available web browser, the client computer dynamically initiates the most compatible and optimal web browser to view the rendered web page in the client computer 102.

In an embodiment, the browser manager 116 manages the entire web browsers available in the client computer 102 and initiates the most compatible web browser to view the rendered web page. For example, if the browser 110 is the most compatible web browser to view a rendered web page then the web browser 110 is dynamically initiated to view the web page.

Figure 2:
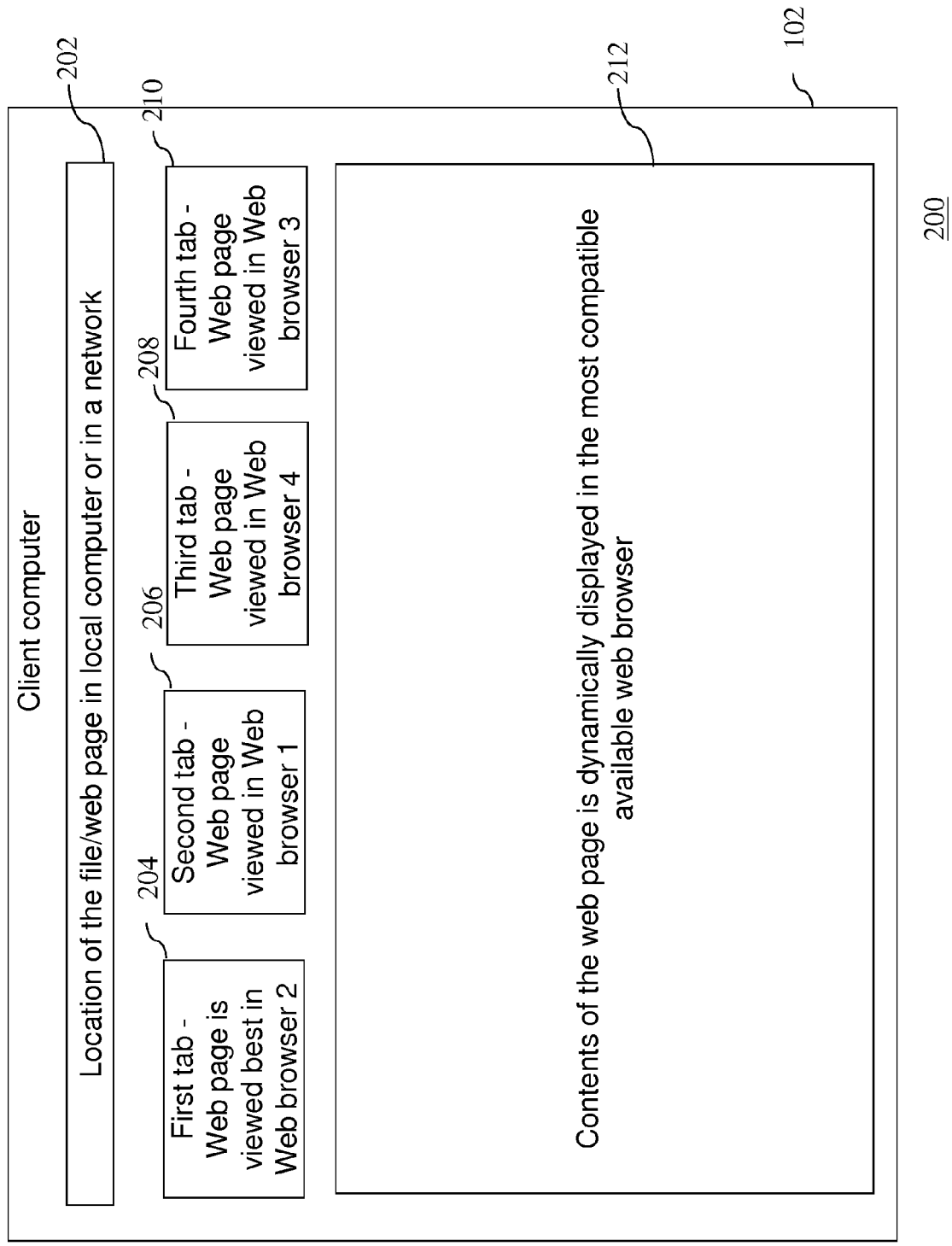
FIG. 2 illustrates an exemplary visual representation of a received web page, in accordance with an embodiment of the invention.

Referring to FIG. 2, an exemplary web page that is received at the client computer 102 is shown. The visual representation 200 is solely for the sake of clarity and for the purposes of this description and a person having ordinary skill in the art may represent the web page in any format. In the visual representation 200, the location of the file or web page in local computer or in a network is displayed in a section 202 of the client computer 102. In an embodiment, the web page is received from the local computer, for example the client computer 102. In another embodiment, the location of the web page on a network is displayed in the section 202. In an example, the location of the web page is a Uniform Resource Locator (URL) of the web page.

The one or more web browsers available in the client computer are then identified. For example, the web browsers 108, 110, 112, and 114 are identified in the client computer 102 before displaying the contents of the web page on the default or preferred web browser. Thereafter, the most optimal web browser for viewing the contents of the web page is identified and initiated. In an embodiment, the data of the web page can be viewed in each of the web browser available in the client computer 102.

In the embodiment, each of the available web browsers is represented as separate tabs. In a sample scenario, a section 204 represents a first tab that shows the web page being viewed in the most optimal web browser, for example the web browser 110 (Web browser 2). A section 206 represents a second tab that shows the second web page being displayed in the web browser 108 (Web browser 1). A section 208 represents a third tab that shows the third web page being displayed in the web browser 114 (Web browser 4). Similarly, a section 210 represents a fourth tab that shows the fourth web page being displayed in the most compatible web browser, for example the web browser 112 (Web browser 3).

In section 212, the web page is automatically displayed in the most compatible web browser, for example the web browser 110. The most compatible web browser is identified based on the web page elements associated with the received web page.

Referring to FIG. 3, a method 300 is initiated at step 302. At step 304, a web page responsive to a request is received. In an embodiment, the request to access the web page is sent from the client computer 102 to the server computer 104. The server computer 104, in response to the request, sends the web page to the client computer 102. At step 306, web page elements associated with the web page is identified by analyzing the web page at the client computer 102. The web page elements include, but are not limited to, tags, specifications, versions, and predefined preferences associated with the web page.

In an embodiment, the web browsers available in the client computer are analyzed based on the web page elements and thereafter the most compatible web browser is identified. For example, to view the web page 208 in the client computer 102, the web browser 108, 110, 112 and 114 are analyzed to identify the most compatible web browser. In an embodiment, the web browser that is most compatible and is best suited to view the web page 208 is identified and initiated. At step 308, the method 300 dynamically initiates the compatible web browser from the one or more web browsers based on the identified web page elements. At step 310, the method 300 is terminated.

Figure 4A:
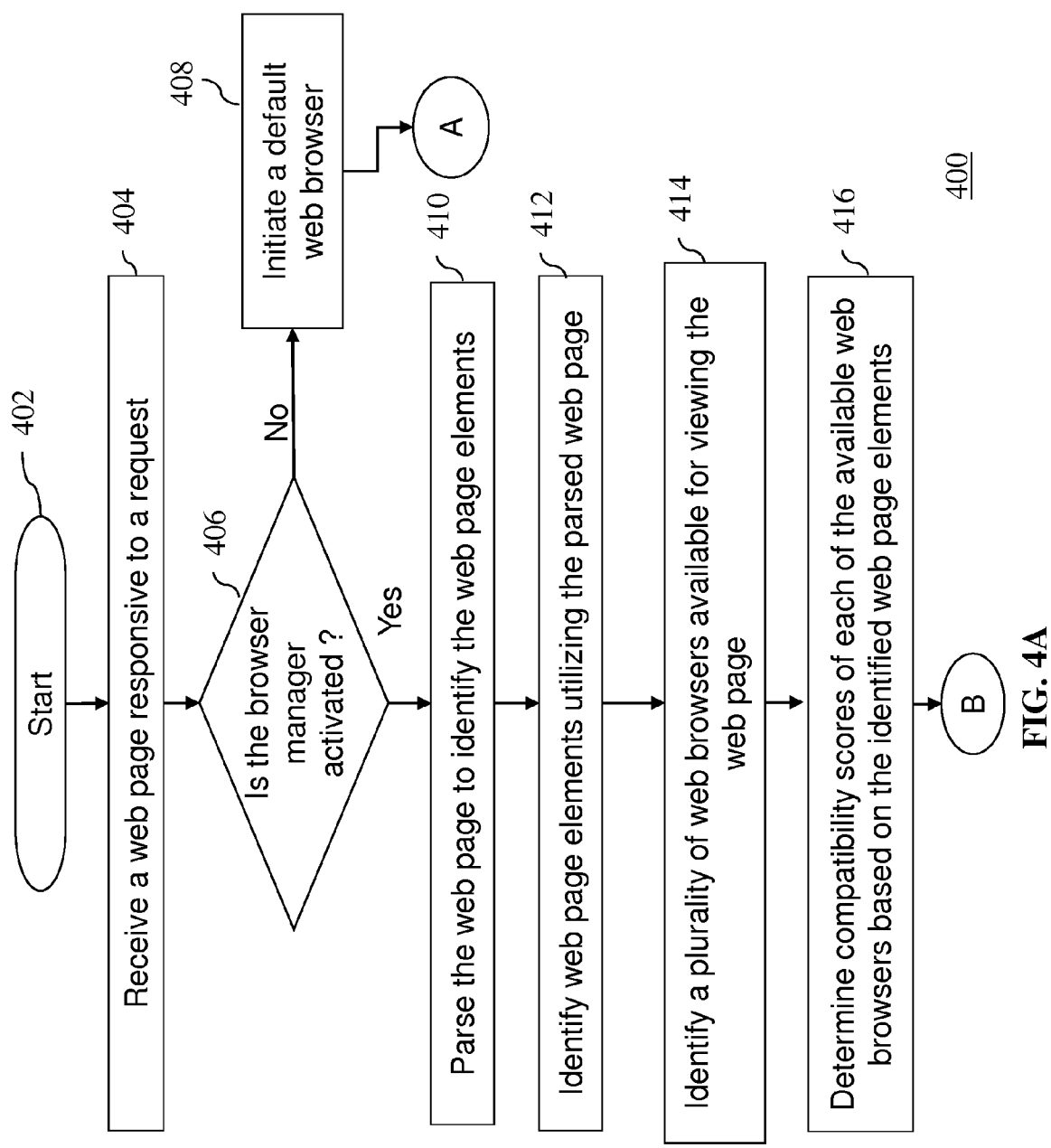
FIG. 4B illustrates a flowchart diagram representing a method for selecting a web browser, in accordance with another embodiment of the invention.

Referring now to FIG. 4A, the method is initiated at step 402. At step 404, a web page responsive to a request is received. In an embodiment, the web page is received at the client computer 102 in response to the request sent to the server computer 104. At step 406, the method 400 checks whether the browser manager is activated or not. A step 408 is performed if the browser manager is not activated otherwise a step 410 is performed. At step 408, a default web browser is initiated if the browser manager is not activated. In an embodiment, the default browser is a web browser that is predefined in the client computer 102 for viewing the received web page. In another embodiment, the default web browser is identified from the information received in the web page. The user of the client computer 102 can also define his/her preferred web browser to view the web page.

At step 410, the received web page is parsed if the browser manager is activated. At step 412, the method identifies web page elements associated with the web page from the parsed web page. Examples of web page elements include, tags, specifications, versions, and predefined preferences associated with the web page. For example, the web page elements are used to identify one or more plug-ins required in the web browser to view the received web page. In another example, the web page elements identify the specification of the web browser for viewing the web page. Thereafter, a step 428 is performed.

At step 414, one or more web browsers available in the client computer 102 for viewing the web page are identified. For example, the web browser 108, 110, 112, and 114 are identified in the client computer 102. At step 416, compatibility scores of each of the available web browsers based on the identified web page elements is determined. In an embodiment, the compatibility score is determined by identifying the number of web page elements supported by each of the available web browser. In an embodiment, information regarding web page elements supported by each of the web browser is maintained in a database (not shown) of the client computer 102.

In an embodiment, the compatibility score is identified based on the percentage or amount of web page data that can be displayed on each of the available web browsers. Hence, a web browser that is able to display maximum percentage or maximum amount of web page data is initiated dynamically. For example, if the web browser 204, 206, 208 and 210 in the client computer 102 are able to display 95 percentage, 100 percentage, 95 percentage and 80 percentage of web page data respectively, then the web browser 206 is identified as the most compatible web browser and is initiated dynamically. In an embodiment, the percentage web page data displayed by each of the available web browsers is calculated in a background process.

Referring now to FIG. 4B, one or more web browsers having a highest compatibility score is selected, at step 418. The web browser having the maximum compatibility score is determined by comparing compatibility score of each of the available web browsers. At step 420, the method checks if there is more than one web browser having a maximum compatibility score. A step 422 is performed if there are more than one web browsers available with the maximum compatibility score otherwise a step 424 is performed.

At step 422, a web browser is initiated from the one or more web browsers based on a predefined preference sequence of the one or more web browsers. The preferred sequence can be regarded for selecting a web browser when the method is unable to select a web browser using the compatible scores. In an embodiment, the web browser preference sequence is stored in the client computer by the user. In another embodiment, the preference sequence is identified in run time.

At step 424, the method 400 dynamically initiates a web browser having the highest compatibility score. At step 426, the method opens the web page in the initiated web browser. Hence, the web page is viewed in the most compatible web browser from the one or more web browsers available in the client computer 102. At step 428, the method 400 is terminated.

Various embodiments of the present invention described above may provide at least, but are not limited to, the following advantages. The present invention provides a method for dynamically selecting a web browser for viewing each web page. The method selects the most optimal web browser and displays the contents of a received web page in the web browser that gives the best quality. The method eliminates human intervention in identifying the most optimal web browser for viewing a web page. The method also selects a default web browser if a browser manager is not activated by a user. The method also allows the user to view the received web page in all the available web browsers based on their compatible scores or predefined sequences.

The flowchart and block diagrams in the FIGS. 1-4B illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method comprising:
   at a computing device having a plurality of installed Web browser applications, receiving, via a user interface of the computing device, a user selection of an item corresponding to a Web page, wherein the user selection represents a request to open the Web page within an instantiated one or more of the installed Web browser applications;
   identifying a set of Web page elements unique to the Web page through an analysis conducted by the computing device;
   utilizing the identified set of Web page elements to determine at the computing device one of the installed Web browser applications for the Web page, wherein the determination of the one of the installed Web browser applications varies from Web page-to-Web page and is based on that Web browser application being more or equally compatible with the identified set of Web page elements than at least one other non-selected one of the installed Web browser applications;
   instantiating at the computing device each of the installed Web browser applications along with the determined one of the installed Web browser applications; and
   opening within each of the instantiated Web browser applications and the determined one of the installed Web browser applications in multiple tabs, the Web page, wherein the determined one of the installed Web browser applications is opened in a first portion of the user interface and each of the installed Web browser applications is opened in a second portion of the user interface, the first portion being substantially larger than the second portion.

2. The method of claim 1, wherein the identifying occurs responsive to receiving the user selection, wherein manual user interactions other than the user selection of the item occur as the computing device performs the identifying, the utilizing, the instantiating, and the opening of the web page within each of the instantiated Web browser applications.

3. The method of claim 1, wherein the determined one of the installed Web browser applications is not a default one of the installed Web browser applications associated with opening Web pages, wherein the default is overridden by the method as a result of the determined one of the installed Web browser applications being more compatible with the set of Web page elements than the default Web browser applications.

4. The method of claim 1, further comprising:
   conveying a content request over a network for the Web page from the computing device to a Web server associated with the Web page;
   responsive to the content request, receiving the Web page from the Web server; and
   analyzing the received Web page to determine the identified set of Web page elements.

5. The method of claim 1, wherein the Web page implements a feature or a command supported by one of the installed Web browser applications and not supported by other ones of the installed Web browser applications, wherein the set of Web page elements identify the feature or command, wherein the determination of the installed Web browser application is based on that Web browser application supporting the feature or the command.

6. The method of claim 1, wherein the Web page implements a feature or a command not supported by at least one of the installed Web browser applications, wherein the set of Web page elements identify the feature or the command, wherein the determination of the one of the installed Web browser applications excludes the at least one of the installed Web browser applications from a set of the installed Web browser applications able to be determined for the Web page.

7. A computer program product comprising:
   one or more computer-readable, non-transitory storage devices;
   program instructions, stored on at least one of the one or more non-transitory storage devices, to receive, via a user interface of a computing device having a plurality of installed Web browser applications, a user selection of an item corresponding to a Web page, wherein the user selection represents a request to open the Web page within an instantiated one or more of the installed Web browser applications;

program instructions, stored on at least one of the one or more non-transitory storage devices, to identify a set of Web page elements unique to the Web page through an analysis conducted by the computing device;

program instructions, stored on at least one of the one or more non-transitory storage devices, to utilize the identified set of Web page elements to determine at the computing device one of the installed Web browser applications for the Web page, wherein the determination of the one of the installed Web browser applications varies from Web page-to-Web page and is based on that Web browser application being more or equally compatible with the identified set of Web page elements than at least one other non-selected one of the installed Web browser applications;

program instructions, stored on at least one of the one or more non-transitory storage devices, to instantiate at the computing device each of the installed Web browser applications along with the determined one of the installed Web browser applications; and program instructions, stored on at least one of the one or more non-transitory storage devices, to open within each of the instantiated Web browser applications and the determined one of the installed Web browser applications in multiple tabs, the Web page, wherein the determined one of the installed Web browser applications is opened in a first portion of the user interface and each of the installed Web browser applications is opened in a second portion of the user interface, the first portion being substantially larger than the second portion.

8. The computer program product of claim 7, wherein the identifying occurs responsive to receiving the user selection, wherein manual user interactions other than the user selection of the item occur as the computing device performs the identifying, the utilizing, the instantiating, and the opening of the web page within each of the instantiated Web browser applications.

9. The computer program product of claim 7, wherein the determined one of the installed Web browser applications is not a default one of the installed Web browser applications associated with opening Web pages, wherein the default is overridden by the method as a result of the determined one of the installed Web browser applications being more compatible with the set of Web page elements than the default Web browser applications.

10. The computer program product of claim 7, further comprising:

program instructions, stored on at least one of the one or more non-transitory storage devices, to convey a content request over a network for the Web page from the computing device to a Web server associated with the Web page;

program instructions, stored on at least one of the one or more non-transitory storage devices, to, responsive to the content request, receive the Web page from the Web server; and program instructions, stored on at least one of the one or more non-transitory storage devices, to analyze the received Web page to determine the identified set of Web page elements.

11. A method comprising:

receiving a web page responsive to a request;

identifying web page elements associated with the web page by analyzing the web page; and utilizing the identified set of web page elements to determine a compatible web browser for the web page, wherein the determination of the compatible web browser varies from web page-to-web page and is based on that web browser being more or equally compatible with the identified set of web Page elements than at least one other non-selected one of a plurality of web browsers available in a computing device;

dynamically opening the web page within the compatible web browser along with opening the web page within each of the plurality of web browsers in separate tabs, wherein the compatible web browser is opened in a first portion of a user interface of the computing device and each of the plurality of the web browsers is opened in a second portion of the user interface, the first portion being substantially larger than the second portion.

12. The method of claim 11, wherein identifying the web page elements comprises:

parsing the received web page to identify the web page elements; and determining at least one of tags, specifications, versions, and predefined preferences associated with the received web page by utilizing the web page elements identified by parsing the received web page.

13. The method of claim 11, wherein the compatible web browser is capable of supporting the identified web page elements.

14. The method of claim 11, wherein opening the web page within the compatible web browser comprises opening the web page within a default web browser based on predefined criteria.

15. The method of claim 11, further comprising calculating compatibility scores for each of the available web browsers, wherein the compatibility scores for each of the available web browsers is calculated by identifying a number of the web page elements supported by each of the available web browsers.

16. The method of claim 15, further comprising:

comparing the compatibility scores for each of the available web browsers; and selecting the compatible web browser based on the comparisons of the compatibility scores for each of the available web browsers.

17. The method of claim 16, wherein opening the web page within the compatible web browser, if compatibility scores are equal, comprises choosing a web browser based on a predefined preference sequence of the available web browsers.

18. The method of claim 11, further comprising maintaining a look-up table including support information of the available web browsers.

* * * * *